W. B. ALLBRIGHT.
DEHAIRING AND WASHING MACHINE FOR HOGS.
APPLICATION FILED JAN. 2, 1915.
1,261,200.
Patented Apr. 2, 1918.
4 SHEETS—SHEET 1.
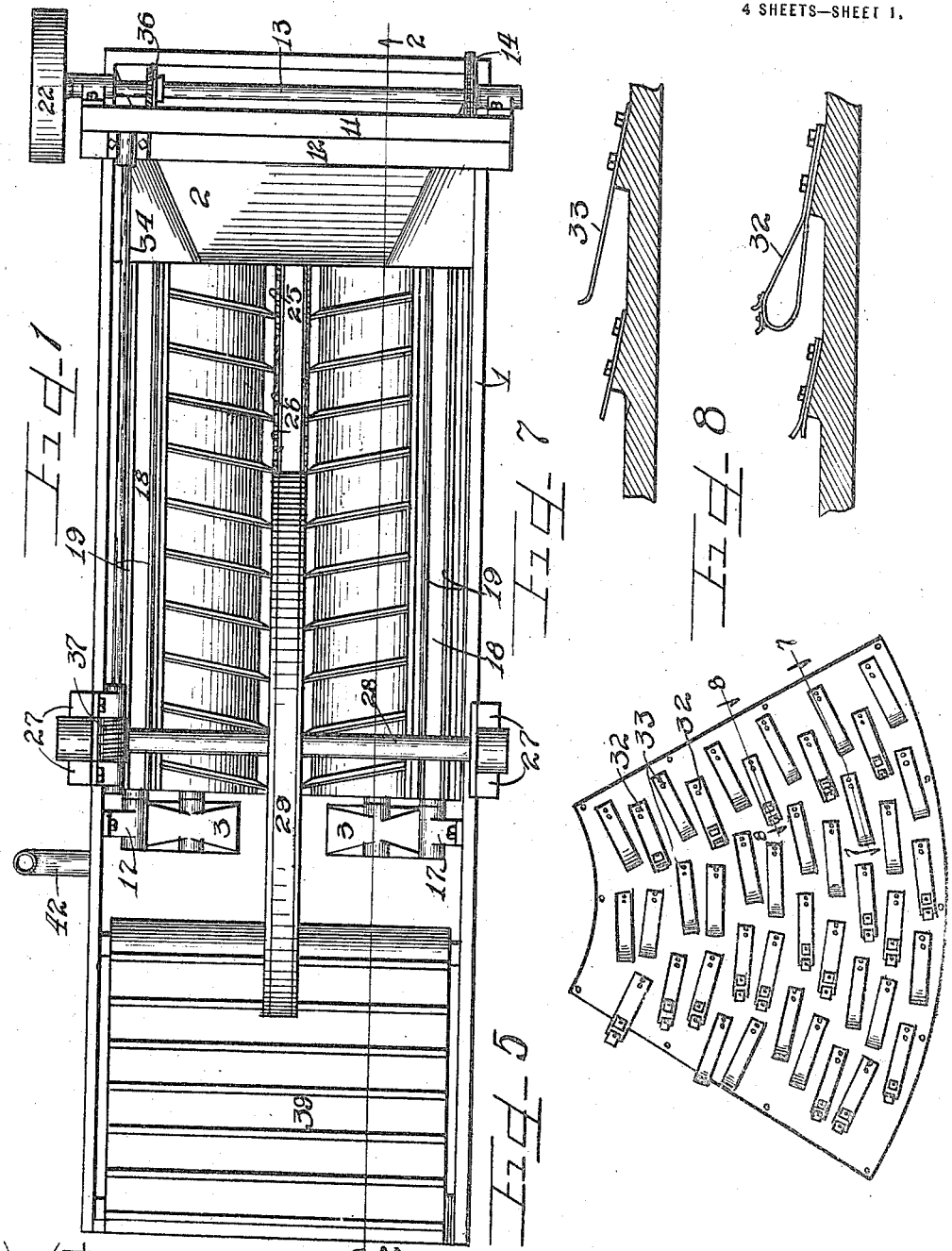

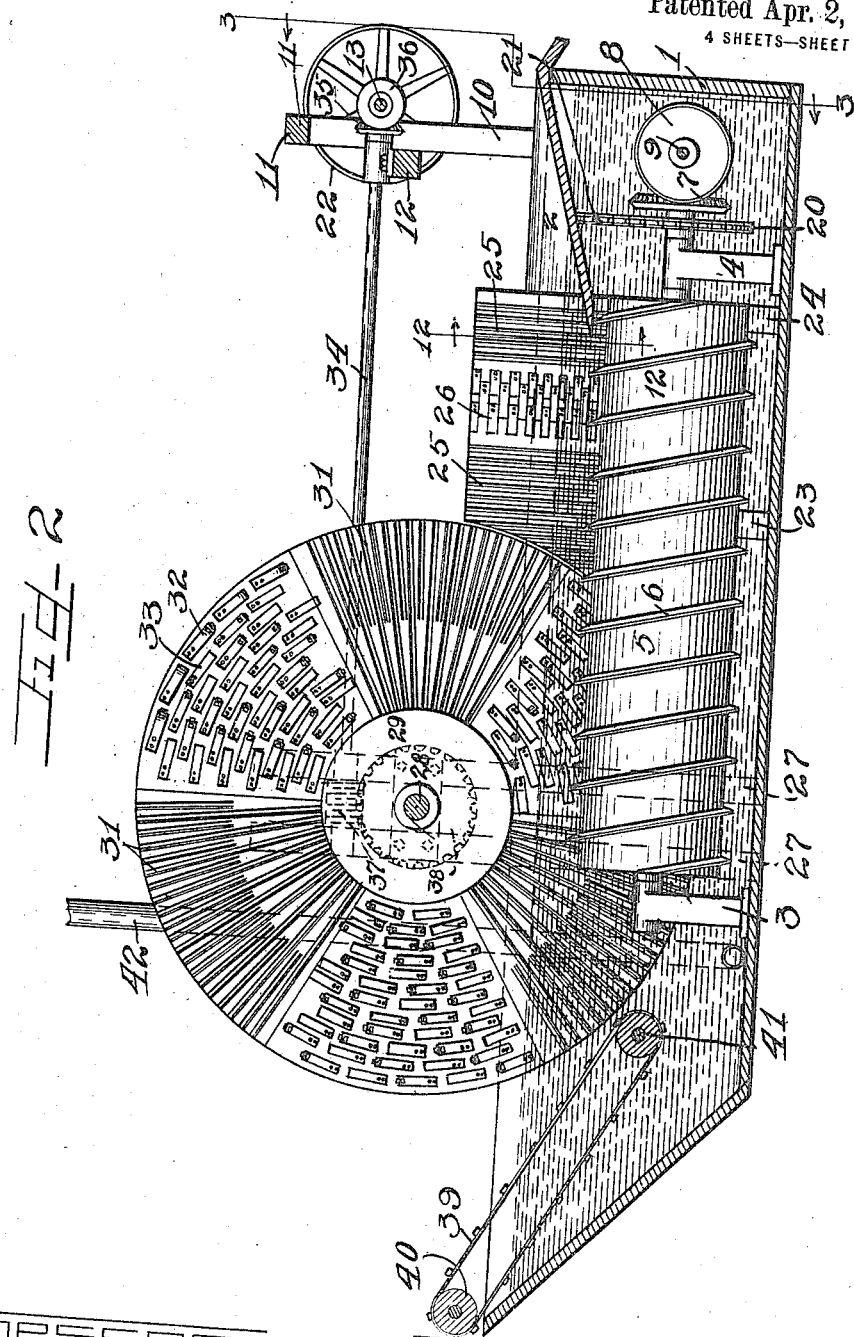

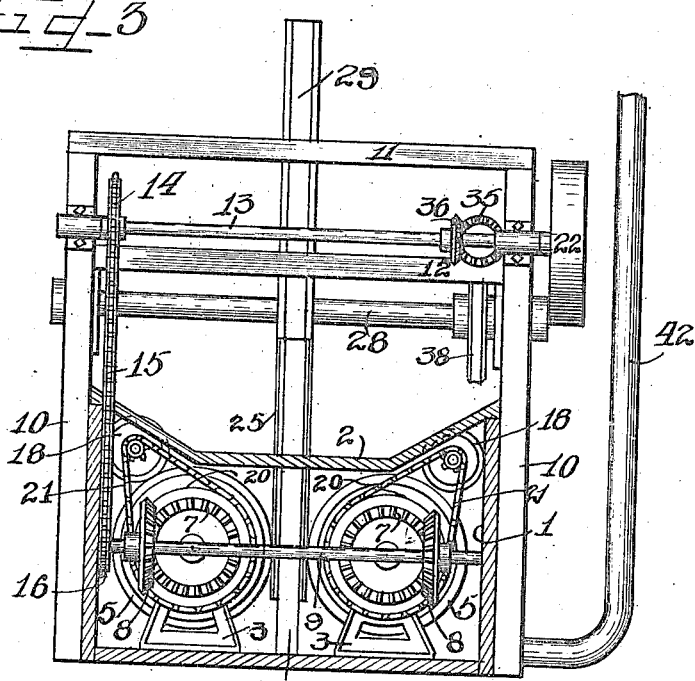
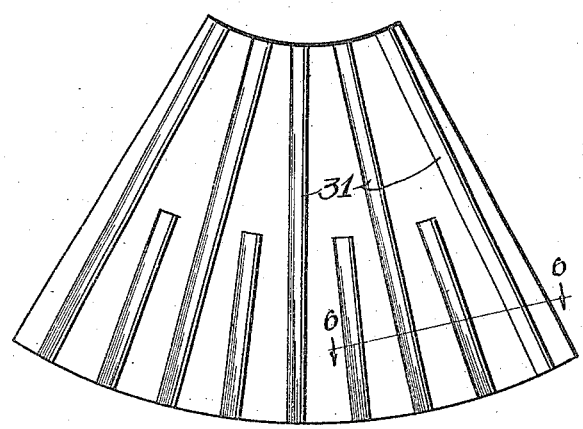

W. B. ALLBRIGHT.
DEHAIRING AND WASHING MACHINE FOR HOGS.
APPLICATION FILED JAN. 2, 1915.
1,261,200.
Patented Apr. 2, 1918.
4 SHEETS—SHEET 4.
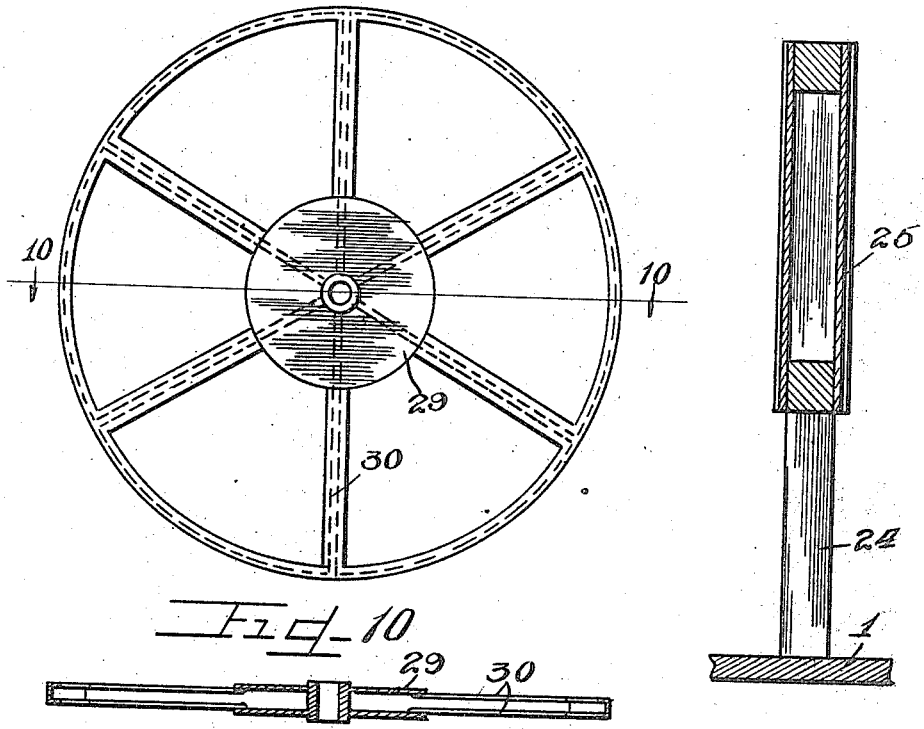
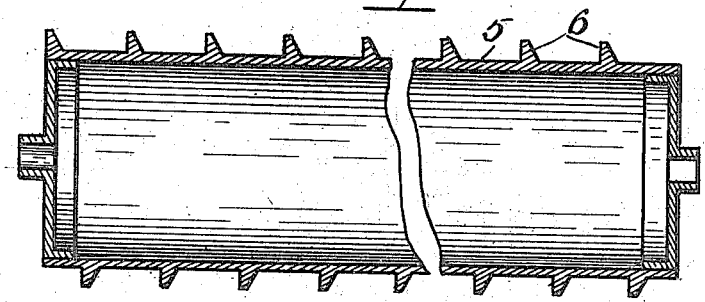

UNITED STATES PATENT OFFICE.

WILLIAM B. ALLBRIGHT, OF CHICAGO, ILLINOIS.

DEHAIRING AND WASHING MACHINE FOR HOGS.

1,261,200.  Specification of Letters Patent.  Patented Apr. 2, 1918.

Application filed January 2, 1915. Serial No. 96.

*To all whom it may concern:*

Be it known that I, WILLIAM B. ALLBRIGHT, a citizen of the United States, and a resident of the city of Chicago, in the county of Cook and State of Illinois, have invented certain new and useful Improvements in Dehairing and Washing Machines for Hogs; and I do hereby declare that the following is a full, clear, and exact description of the same, reference being had to the accompanying drawings, and to the numerals of reference marked thereon, which form a part of this specification.

This invention relates to a hog dehairing machine wherein a partially submerged carcass is conveyed longitudinally by means of scraper mechanisms, and is dehaired during such movement by contact with rotarily acting scraper elements, as well as rotating members which act to resist the movement of the carcass through the machine. In this type of dehairing machine two paths for the carcasses are provided whereby two carcasses may be operated upon simultaneously, and with one of the scraping mechanisms of the machine capable of acting simultaneously on carcasses in each path independently of one another.

It is an object of this invention to construct a dehairing machine wherein a carcass is conveyed longitudinally therethrough while partially submerged by rotating conveying rolls, and during its progress is subjected to the action of rotarily acting, as well as stationary, scraping devices.

It is also an object of this invention to construct a dehairing machine for carcasses wherein rotarily acting drums mounted adjacent a stationary partition act to convey carcasses independently on each side of the partition and into the field of operation of a vertical scraping wheel mounted in alinement with said partition whereby the carcasses confined against said wheel and on said roll are caused to rapidly rotate with a consequent dehairing of the same.

It is a further object of this invention to construct a machine wherein the hogs are introduced by gravity and conveyed upon suitable scraping rollers into the field of operation of other scraping mechanisms and are finally manually thrust out of the field of operation thereof by an operator and floated upon a suitable conveyer for elevating and conveying the same from the machine.

It is finally an object of this invention to construct a dehairing machine consisting of few parts wherein duplicate mechanisms are provided for dehairing a plurality of hogs simultaneously and independently of one another.

The invention (in a preferred form) is illustrated in the drawings and hereinafter more fully described.

In the drawings:

Figure 1 is a top plan view of a machine embodying the principles of my invention.

Fig. 2 is a section taken on line 2—2 of Fig. 1, with parts in elevation.

Fig. 3 is a section on line 3—3 of Fig. 2, with parts in elevation.

Fig. 4 is an enlarged elevation of one of the sector scraping devices of the wheel scraper.

Fig. 5 is a similar view of another type of sector scraping device forming a part of said wheel.

Fig. 6 is a fragmentary section on line 6—6 of Fig. 4.

Fig. 7 is a fragmentary section on line 7—7 of Fig. 5.

Fig. 8 is a fragmentary section on line 8—8 of Fig. 5.

Fig. 9 is an enlarged elevation of the scraping wheel with the scraper sectors removed therefrom.

Fig. 10 is a section on line 10—10 of Fig. 9.

Fig. 11 is a longitudinal central section taken through one of the conveying rolls of the machine.

Fig. 12 is a fragmentary section on line 12—12 of Fig. 2.

As shown in the drawings:

The dehairing mechanisms are contained in a tank denoted by the reference numeral 1, with an inclined floor or chute 2, provided at one end to introduce carcasses thereinto. A pair of standards 3, are secured upon the floor within the tank near the discharge end thereof and a similar pair of standards 4, are provided near the entrance end of said tank and journaled in each pair of said standards 3 and 4, are longitudinally disposed rolls 5, each having a helically formed continuous scraping rib 6, thereon. Secured upon the ends of the shafts of each of said rolls 5, at the forward end of the machine beneath said chute 2, are bevel gears 7, and meshing with each thereof are the respective bevel gears 8, secured upon a countershaft 9, which is journaled in the side walls and extends transversely of said tank. A pair of uprights 10, are mounted on each side of the tank at the forward end thereof, and are connected together across their tops by means of a cross piece 11, as well as by an intermediate cross piece 12. Journaled upon said uprights 10, is a transverse drive shaft 13, on which is secured a sprocket 14, which is connected to drive said countershaft 9, through a chain 15, trained around said sprocket and around a sprocket 16, secured upon said shaft 9.

Bearing brackets 17, are secured upon the side walls of the tank and support journaled therein small longitudinal rolls 18, disposed to one side and above the main rolls 5, and having scraper elements 19, extending therealong. For the purpose of driving said small rolls at high speed a sprocket wheel 20, is secured upon each of the main roll shafts, and trained thereabout and about a small sprocket wheel, one secured on the end of each of said rolls 18, are driving chains 21. A driving pulley 22, is secured upon the outer end of said drive shaft 13, and power may be imparted thereto in any suitable manner and from any suitable source. Uprights 23 and 24, are mounted within the tank between the forward ends of said respective main rolls 5, and secured thereon is a partition made up of a number of vertically disposed stationary scraper bars 25, and looped flexible dehairing mechanisms 26. Heavy supporting members 27, extend upwardly on each side of the tank near the rear end thereof and, journaled thereon above the tank, is a shaft or axle 28. Mounted upon said shaft 28, to rotate therewith and disposed between said main rolls 5, is a large wheel 29. Secured to the spokes 30, and rim of said wheel 29, are sector plates, six on each side, with three thereof carrying radially disposed scraper bars 31, and the other three having flexible looped scrapers 32, and semi-flexible metal scrapers 33. Driving connections are provided between said wheel shaft 28, and driving shaft 13, and these consist of a horizontally disposed shaft 34, journaled at one of its ends upon said cross piece 12, and at its other end on said uprights 27, and provided with a bevel pinion 35, meshing with a bevel pinion 36, secured upon said drive shaft 13. A worm 37, is secured upon the other end of said shaft 34, and meshes with a worm wheel 38, secured upon said shaft 28. A slatted conveyer 39, trained about suitable rolls 40 and 41, respectively, is mounted in inclined position at the discharge end of the machine to receive the carcasses thrust from the rolls 5, by the operator to elevate and discharge the same. A relatively large pipe 42, communicates with the bottom of the tank, and is connected to a pump or any other suitable means for withdrawing the water and hair from the tank, so that the hair removed from the carcasses may be reclaimed. Of course, water may be introduced into the tank in any suitable manner. Although I have not shown a drive for the conveyer 39, it is obvious that it may be operated by hand or connected to the driving connections of the machine in any manner desired.

The operation is as follows:

The carcasses are introduced into the machine upon the inclined floor 2, and slide downwardly to one side of the partition upon one of the rotating scraping conveying rolls 5. The carcass is conveyed along and rotated by said rolls while bearing against the stationary scraping mechanisms 25 and 26, on said partition, and of course, a large part of the hair is removed. As the carcass continues in its progress through the machine, it comes into contact with the reversely rotating wheel carrying the various scraper devices 31, 32, and 33, which act upon all sides of the rotating carcass to dehair the same. The speed of this wheel and the forward impulse to a carcass imparted by the rotating roll 5, is such that the carcass is maintained in the field of operation of the scraping devices until manually thrust onwardly by an operator. Of course, after leaving either one of the rolls 5, the carcass is floated over to the conveyer 39, which discharges it from the machine. It is apparent that the main rolls 5, are entirely submerged in the machine, and the depth of the water is such that the carcasses are partially submerged during their progress therethrough. In the event of a carcass, due to its rapid rotation, tending to climb upwardly to one side of the machine the rapidly rotating roll 18 will strike the same with a dehairing action and prevent accidental ejection of the carcass.

I am aware that various details of construction may be varied through a wide range without departing from the principles of this invention. I therefore do not purpose limiting the patent granted otherwise than necessitated by the prior art.

I claim as my invention:

1. In a dehairing machine for carcasses rotating means for conveying and scraping the carcasses introduced into the machine, and a flat scraping wheel mounted adjacent thereto adapted to receive the carcass contacting against the flat surface thereof to dehair the same.

2. In a device of the class described longitudinally disposed rotatable conveying mechanism, stationary scraping means coacting therewith to dehair a carcass, and a flat sided scraping wheel with its flat side contacting the carcass and moving in a direction to resist movement of and acting to dehair the carcass.

3. In a device of the class described, conveyers for carcasses, stationary means coacting therewith adapted to simultaneously scrape carcasses on said conveyers, and rotating dehairing means adapted to act on carcasses on all of said conveyers simultaneously.

4. In a device of the class described double acting stationary scraping mechanism, double acting rotating scraping mechanism and conveyers for moving carcasses on both sides of said stationary and rotating scraping mechanisms to be scraped thereby.

5. In a device of the class described cylindrical rotating means adapted to convey a carcass longitudinally thereon, vertically disposed stationary scraping means arranged adjacent thereto adapted to act on the carcass moving therepast, and rotating flat sided scraper mechanism, the flat side thereof acting longitudinally on the carcass to dehair and resist movement of the same therepast.

6. In a device of the class described a plurality of rotating conveying rolls, a stationary partition disposed therebetween with scraper elements thereon, and a wheel adapted to rotate in a vertical plane between said conveying rollers to scrape carcasses on either one thereof independently of the other.

7. In a device of the class described duplicate conveying mechanisms adapted to operate simultaneously and independently on different carcasses, and unitary rotatable scraping means acting simultaneously on said carcasses on said mechanisms independently of one another.

8. In a device of the class described longitudinally mounted rotatable rolls, scraping means on each thereof adapted to move a carcass therealong, stationary scraping means mounted between said rolls adapted to act on a carcass moving therepast, a shaft journaled transversely and above said rolls, and a large scraping wheel mounted on said shaft and rotating between said rolls to act on carcasses conveyed on either one thereof independently of one another.

9. In a dehairing machine of the class described, inclined means down which a carcass slides when introduced into the tank into the field of operation of the dehairing means, said dehairing means comprising rotatable mechanism disposed longitudinally in the machine adapted to receive a carcass disposed thereover longitudinally thereon, and operating upwardly beneath the carcass to dehair the same and at the same time rotate the carcass, and scraping means mounted adjacent said rotatable dehairing mechanism against which the rotating carcass is thrust by said mechanism and held in the field of operation of said mechanism as it is moved longitudinally through the machine.

10. In a dehairing machine of the class described, stationary means inclined downwardly upon which a carcass moves by gravity when introduced into the machine, longitudinally disposed rotatable dehairing mechanism to receive the carcass longitudinally thereon to rotate and dehair the same, and scraping means at one side of said rotatable dehairing mechanism along which the carcass is moved acting to hold the carcass confined in the field of operation of the dehairing mechanism and serving further to dehair the carcass as it is moved therealong, and a drive for said dehairing mechanism to rotate the same in a direction to work upwardly beneath a carcass being dehaired.

11. In a machine of the class described, stationary and movable dehairing means and mechanisms forming a cradle to receive a carcass, and said dehairing mechanisms rotating upwardly beneath the carcass to rotate the same in contact with the stationary means at one side thereof to entirely dehair the carcass.

12. In a dehairing machine of the class described, stationary dehairing means and dehairing mechanisms affording a cradle to receive a carcass deposited longitudinally therein, said dehairing mechanisms rotatable and adapted to work upwardly beneath the carcass partially supporting the same and thrusting the carcass as well as rotating the same against said stationary means whereby the hair is removed from the carcass.

13. In a machine of the class described, stationary means mounted therein at one side thereof, and rotatable scraping mechanism working upwardly beneath a carcass and partially supporting the same, and rotating the carcass and thrusting the carcass against said stationary means to dehair the carcass.

14. In a dehairing machine of the class described, a stationary element extending longitudinally within the machine, a shaft extending longitudinally adjacent said stationary element, and dehairing means mounted thereon and rotatable with said shaft adapted to work upwardly beneath a carcass to rotate, dehair and partially support the same against said stationary means, and inclined means mounted in the machine adapted to permit a carcass to move downwardly gravitationally thereon upon introduction into the machine for movement into the field of operation of the dehairing mechanism.

15. In a machine of the class described, a tank, stationary means extending centrally and longitudinally therethrough, dehairing elements mounted on said means at each side thereof, longitudinally disposed revoluble dehairing mechanisms journaled on each side of said stationary means adapted to support and rotate a carcass, one on each side of said stationary means, and in contact with the respective surfaces thereof to dehair the carcass, and means rotatable in a vertical plane and in the same plane with said stationary means at one end thereof adapted to operate over the surface of the carcasses presented on each side thereof to assist in dehairing the same.

16. In a machine of the class described, a tank, stationary means extending longitudinally therethrough, scraping elements on each side of said means, longitudinally disposed rotatable scraping mechanisms mounted at each side of said means adapted to co-act therewith to dehair carcasses and to advance the carcasses longitudinally through the machine on both sides of said means, and rotatable mechanism with its axis of rotation transverse the machine and operating in a plane coincident with the plane of said stationary means adapted to receive carcasses on each side thereof as they are moved along by said longitudinal rotatable means to assist in dehairing the carcasses.

17. A carcass dehairing machine comprising a stationary scraping member having scraping blades on both sides thereof, a rotatable scraping wheel having scraping blades on both sides thereof and conveyers for moving carcasses along both sides of said stationary and rotatable scraping elements.

18. A carcass dehairing machine comprising double acting stationary and rotating dehairing mechanisms adapted to simultaneously act on a plurality of carcasses passing on opposite sides of the mechanism and mechanism for conveying carcasses along opposite sides of the dehairing mechanism.

19. In a machine of the class described single stationary and rotatable dehairing elements, each adapted to act on carcasses on opposite side thereof and an independent mechanism for rotating the carcasses.

20. In a device of the class described a fixed scraping partition, and scraping mechanism secured to opposite sides thereof.

21. In a machine of the class described a fixed scraping member, rigid scraping blades thereon, and flexible scraping blades thereon.

22. In a machine of the class described a fixed scraping member, rigid scraping blades thereon and semi-flexible blades secured thereon.

23. In a machine of the class described a stationary partition having scraping mechanisms secured thereto and means for moving carcasses past said partition and forcing the same against the partition to dehair the same.

24. In a machine of the class described a stationary partition having scraping mechanism secured thereto and means for moving carcasses past said partition, forcing the same against the partition to dehair the same and a rotatable scraping wheel acting on the carcasses after passing said partition.

25. In a machine of the class described stationary scraping and dehairing mechanism and mechanism for loosely supporting and rolling a carcass against the stationary scraping mechanism at the same time moving the carcass along the scraping mechanism to dehair and clean the same.

26. In a machine of the class described stationary scraping and dehairing mechanism and mechanism for dragging a carcass over the stationary scraping mechanism and continuously turning the same for all parts of the carcass to contact the scraping mechanism and be dehaired thereby.

27. In a machine of the class described stationary dehairing mechanism and mechanism for rubbing a carcass across opposite faces of the stationary mechanism.

28. In a machine of the class described stationary dehairing mechanism, mechanism for rubbing a carcass across the face of the stationary mechanism, and turning the carcass continuously to expose all of the carcass to the actions of the dehairing mechanism.

29. In a machine of the class described a central scraping mechanism and conveyers on each side thereof conveying rows of carcasses along each side of the central scraping mechanism.

30. In a machine of the class described mechanism for conveying a plurality of rows of carcasses through a machine and a centrally disposed scraping mechanism for acting on all of said rows of carcasses simultaneously.

31. In a device of the class described a stationary scraping member, rigid blades thereon, flexible blades secured thereto and means for forcing a carcass in contact with said blades and rotating and advancing the same against the blades.

32. In a device of the class described a fixed scraping member adapted to act on carcasses on each side thereof and a rotatable scraping wheel adapted to act on carcasses in each side thereof.

33. In a device of the class described a scraping wheel having sections secured thereto, rigid scraping blades on some of said sections and flexible scraping blades on other of said sections.

In testimony whereof I have hereunto subscribed my name in the presence of two subscribing witnesses.

WILLIAM B. ALLBRIGHT.

Witnesses:
 CHARLES W. HILLS, Jr.,
 FRANK K. HUDSON.

Copies of this patent may be obtained for five cents each, by addressing the "Commissioner of Patents, Washington, D. C."